(12) United States Patent
Wu et al.

(10) Patent No.: US 10,762,321 B2
(45) Date of Patent: Sep. 1, 2020

(54) FINGERPRINT RECOGNITION UNIT CIRCUIT, CONTROL METHOD THEREFOR, AND FINGERPRINT RECOGNITION APPARATUS

(71) Applicant: TRULY (HUIZHOU) SMART DISPLAY LIMITED, Huizhou, Guangdong (CN)

(72) Inventors: Jinkun Wu, Guangdong (CN); Chao Tian, Guangdong (CN); Jie Zhu, Guangdong (CN); Junwen Hu, Guangdong (CN); Donghyup Jeon, Guangdong (CN); Zhisheng Xie, Guangdong (CN); Junhai Su, Guangdong (CN); Jianhua Li, Guangdong (CN)

(73) Assignee: TRULY (HUIZHOU) SMART DISPLAY LIMITED, Huizhou, Guangdong (CN)

( * ) Notice: Subject to any disclaimer, the term of this patent is extended or adjusted under 35 U.S.C. 154(b) by 0 days.

(21) Appl. No.: 16/314,417

(22) PCT Filed: Jan. 20, 2017

(86) PCT No.: PCT/CN2017/071812
§ 371 (c)(1),
(2) Date: Dec. 30, 2018

(87) PCT Pub. No.: WO2018/006588
PCT Pub. Date: Jan. 11, 2018

(65) Prior Publication Data
US 2019/0171860 A1    Jun. 6, 2019

(30) Foreign Application Priority Data
Jul. 4, 2016 (CN) .......................... 2016 1 0525709

(51) Int. Cl.
*G06K 9/00* (2006.01)
*G06F 3/044* (2006.01)
*G06F 3/041* (2006.01)

(52) U.S. Cl.
CPC ........... *G06K 9/0002* (2013.01); *G06F 3/044* (2013.01); *G06F 3/0418* (2013.01)

(58) Field of Classification Search
CPC ...... G06K 9/0002; G06F 3/0418; G06F 3/044
See application file for complete search history.

(56) References Cited

U.S. PATENT DOCUMENTS

| 6,259,804 B1 | 7/2001 | Setlak et al. |
| 2005/0110103 A1 | 5/2005 | Setlak |

(Continued)

FOREIGN PATENT DOCUMENTS

| CN | 1290383 A | 4/2001 |
| CN | 1882951 A | 12/2006 |

(Continued)

OTHER PUBLICATIONS

The 1st Office Action regarding Chinese Patent Application No. CN201610525709.2, dated Oct. 22, 2018. English Translation Provided by http://globaldossier.uspto.gov.

(Continued)

*Primary Examiner* — Stephen G Sherman
(74) *Attorney, Agent, or Firm* — Yue (Robert) Xu; Apex Attorneys at Law, LLP

(57) ABSTRACT

A fingerprint recognition unit circuit is provided, including a read line, a signal scanning terminal, a first power supply terminal, a second power supply terminal, a third power supply terminal, a first signal terminal, a second signal terminal, an exploring electrode, an output unit, a threshold compensation unit and a resetting unit. A method for controlling a fingerprint recognition unit circuit is applied to the fingerprint recognition unit circuit. A fingerprint recognition apparatus includes a glass substrate and the fingerprint recognition unit circuit.

11 Claims, 10 Drawing Sheets

(56) References Cited

U.S. PATENT DOCUMENTS

| | | |
|---|---|---|
| 2013/0314148 A1 | 11/2013 | Kang et al. |
| 2014/0104236 A1 | 4/2014 | Hamaguchi et al. |
| 2014/0292666 A1 | 10/2014 | Shi et al. |
| 2016/0253541 A1* | 9/2016 | Yang ........................ G09G 3/32 382/124 |
| 2016/0275331 A1* | 9/2016 | Cheng .................. G01N 27/228 |
| 2017/0103706 A1 | 4/2017 | Yang et al. |
| 2017/0270338 A1 | 9/2017 | Ding |

FOREIGN PATENT DOCUMENTS

| | | |
|---|---|---|
| CN | 102279924 A | 12/2011 |
| CN | 103620532 A | 3/2014 |
| CN | 104112120 A | 10/2014 |
| CN | 104662430 A | 5/2015 |
| CN | 104778923 A | 7/2015 |
| CN | 105046247 A | 11/2015 |
| CN | 105426865 A | 3/2016 |
| CN | 205121586 U | 3/2016 |
| CN | 106156741 A | 11/2016 |

OTHER PUBLICATIONS

International Search Report for PCT/CN2017/071812 dated Mar. 15, 2017, ISA/CN.

\* cited by examiner

FINGERPRINT RECOGNITION UNIT CIRCUIT, CONTROL METHOD THEREFOR, AND FINGERPRINT RECOGNITION APPARATUS

This application is the national phase of International Patent Application No. PCT/CN2017/071812, titled "FINGERPRINT RECOGNITION UNIT CIRCUIT, CONTROL METHOD THEREFOR, AND FINGERPRINT RECOGNITION APPARATUS", filed on Jan. 20, 2017, which claims the priority to Chinese Patent Application No. 201610525709.2, titled "FINGERPRINT RECOGNITION UNIT CIRCUIT, CONTROL METHOD THEREFOR, AND FINGERPRINT RECOGNITION APPARATUS", filed on Jul. 4, 2016 with the Chinese Patent Office, both of which are incorporated herein by reference in their entireties.

FIELD

The present disclosure relates to the field of electronic circuits, and in particular to a fingerprint recognition unit circuit, a method for controlling a fingerprint recognition unit circuit, and a fingerprint recognition device.

BACKGROUND

At present, with the rapid development of smart phones, the mobile internet is applied in every aspect of lives of people, and people pay more and more attention to information security. In view of this, the fingerprint recognition technology is developed rapidly and there is a great market demand for fingerprint recognition. The capacitance induction fingerprint recognition technology based on the semiconductor process is well developed, and people may detect fingerprint information via silicon sensors. A conventional fingerprint recognition unit circuit includes a detection electrode. An induction capacitance is generated between a surface of a finger and the detection electrode when the finger is placed over the detection electrode. There are concave portions and convex portions in a fingerprint on the surface of the finger, and a capacitance generated between a concave portion of a fingerprint and the detection electrode is different from a capacitance generated between a convex portion of the fingerprint and the detection electrode. The capacitance generated between the concave portion and the detection electrode is smaller than the capacitance generated between the convex portion and the detection electrode, so that the concave portion and the convex portion in the fingerprint can be determined and distinguished based on induction capacitances.

In addition, with the development of the low temperature poly-silicon (LTPS) technology, a fingerprint recognition method based on a glass substrate and the LTPS process is put forward. Moreover, the fingerprint recognition method based on a glass substrate and the LTPS process has a great cost advantage than a fingerprint recognition method based on the silicon process. Therefore, it is important to research the fingerprint recognition method based on a glass substrate and the LTPS process.

However, due to limitation factors in the LTPS process, there is a poor uniformity among threshold voltages (VTH) of thin film transistors (TFT). There may be a great difference between threshold voltages of thin film transistors at different positions on the same substrate, and there may also be a great difference between thin film transistors from different batches. For a conventional fingerprint recognition unit circuit, a difference between threshold voltages may result in a great difference in a recognition result, which makes it impossible to accurately determine concave portions and convex portions in the fingerprint, and it becomes difficult to perform fingerprint recognition on glass.

SUMMARY

In view of the above technical problems, it is required to provide a fingerprint recognition unit circuit, a method for controlling a fingerprint recognition unit circuit, and a fingerprint recognition device, to perform threshold compensation and achieve fingerprint recognition with high accuracy.

A fingerprint recognition unit circuit is provided which includes: a read line, a signal scan terminal, a first power supply terminal, a second power supply terminal, a third power supply terminal, a first signal terminal, a second signal terminal, a detection electrode, an output unit, a threshold compensation unit and a reset unit. The detection electrode is configured to contact a surface of a finger to generate an induction capacitance. The output unit is connected to the detection electrode, the signal scan terminal, the first power supply terminal and the read line and is configured to detect the induction capacitance, generate a current signal, and transmit the current signal to the read line. The threshold compensation unit is connected to the second power supply terminal, the first signal terminal, the detection electrode and the output unit and is configured to compensate for a threshold voltage of the output unit. The reset unit is connected to the third power supply terminal, the second signal terminal and the detection electrode and configured to reset the detection electrode.

In one embodiment, the output unit includes an amplification unit and a transmission unit. The amplification unit is connected to the detection electrode and the read line and is configured to detect the induction capacitance and generate a current signal. The transmission unit is connected to the signal scan terminal, the first power supply terminal and the amplification unit and is configured to transmit a first power supply voltage signal to the amplification unit.

In one embodiment, the output unit includes an amplification unit and a transmission unit. The amplification unit is connected to the detection electrode and is configured to detect the induction capacitance and generate a current signal. The transmission unit is connected to the signal scan terminal, the first power supply terminal, the amplification unit and the read line and is configured to transmit a first power supply voltage signal to the amplification unit and transmit the current signal generated by the amplification unit to the read line.

In one embodiment, the transmission unit includes a first transistor, the amplification unit includes a second transistor, the threshold compensation unit includes a third transistor and a fourth transistor, and the reset unit includes a fifth transistor. A gate of the first transistor is connected to the signal scan terminal to receive a scan signal, and a source of the first transistor is connected to the first power supply terminal. A gate of the second transistor is connected to the detection electrode, a source of the second transistor is connected to a drain of the first transistor, and a drain of the second transistor is connected to the read line. A gate of the third transistor is connected to the first signal terminal to receive a first selection signal, a source of the third transistor is connected to the second power supply terminal, and a drain of the third transistor is connected to the source of the second transistor. A gate of the fourth transistor is connected to the gate of the third transistor, a source of the fourth transistor is connected to the drain of the second transistor, and a drain of the fourth transistor is connected to the detection electrode. A gate of the fifth transistor is connected to the second signal terminal to receive a second selection signal, a source of the fifth transistor is connected to the detection electrode, and a drain of the fifth transistor is connected to the third power supply terminal.

In one embodiment, the reset unit includes a sixth transistor, and the transmission unit includes a seventh transistor. A gate of the sixth transistor is connected to the second signal terminal, and a drain of the sixth transistor is connected to the third power supply terminal. A gate of the seventh transistor is connected to the signal scan terminal, a source of the seventh transistor is connected to the drain of the second transistor, and a drain of the seventh transistor is connected to a source of the sixth transistor and the read line.

In one embodiment, the first transistor, the second transistor, the third transistor, the fourth transistor, the fifth transistor, the sixth transistor and the seventh transistor are P-type thin film transistors or N-type thin film transistors.

A method for controlling a fingerprint recognition unit circuit is further provided, which is applied to the fingerprint recognition unit circuit described above. The method includes:

in a first time period, inputting a signal with a first level to the second signal terminal and inputting a signal with a second level to the signal scan terminal and the first signal terminal;

in a second time period, inputting a signal with the first level to the first signal terminal and inputting a signal with the second level to the signal scan terminal and the second signal terminal; and in a third time period, inputting a signal with the first level to the signal scan terminal and inputting a signal with the second level to the first signal terminal and the second signal terminal, where the first time period, the second time period and the third time period are continuous.

In one embodiment, the first level is a low level and the second level is a high level.

In one embodiment, the first level is a high level and the second level is a low level.

A fingerprint recognition device is further provided, which includes a glass substrate and the fingerprint recognition unit circuit described above. An array of detection electrodes of multiple fingerprint recognition unit circuits are distributed on the glass substrate.

With the above fingerprint recognition unit circuit, an induction capacitance is generated when a surface of a finger contacts the detection electrode. The output unit detects the induction capacitance, generates a current signal, and transmits the current signal to the read line. The read line is connected to an external processing unit to process the current signal. The threshold compensation unit is configured to compensate for a threshold voltage of the output unit. The reset unit resets the detection electrode, so that the detection electrode is in an initial recognition state when the detection electrode contacts a surface of a finger next time, thereby avoiding mutual interference between two successive fingerprint recognitions. In this way, the technical problem of non-uniform threshold voltages of TFTs due to limitation factors in the LTPS process, and the technical problem of great difference between VTHs of TFTs at different positions are solved, and threshold compensation is achieved, thereby improving the accuracy and recognition efficiency of fingerprint recognition, and thus effectively reducing a cost.

BRIEF DESCRIPTION OF THE DRAWINGS

FIG. 2-1 is a schematic diagram showing functional modules of a fingerprint recognition unit circuit according to another embodiment;

FIG. 2-2 is a schematic diagram showing functional modules of a fingerprint recognition unit circuit according to another embodiment;

DETAILED DESCRIPTION

Embodiments of the present disclosure are described in detail in conjunction with the drawings hereinafter, to make the above objects, features and advantages of the present disclosure more apparent and easier to be understood. Specific details are set forth in the following description for a better understanding of the present disclosure. However, the present disclosure may be implemented in many other ways than those described herein, and those skilled in the art may make similar modifications without departing from the spirit of the present disclosure, and thus the present disclosure is not limited by the embodiments described hereinafter.

It is to be noted that, an element being "connected" to another element may indicate that the element is directly connected to the other element or there is an intermediate element.

Figure 1:
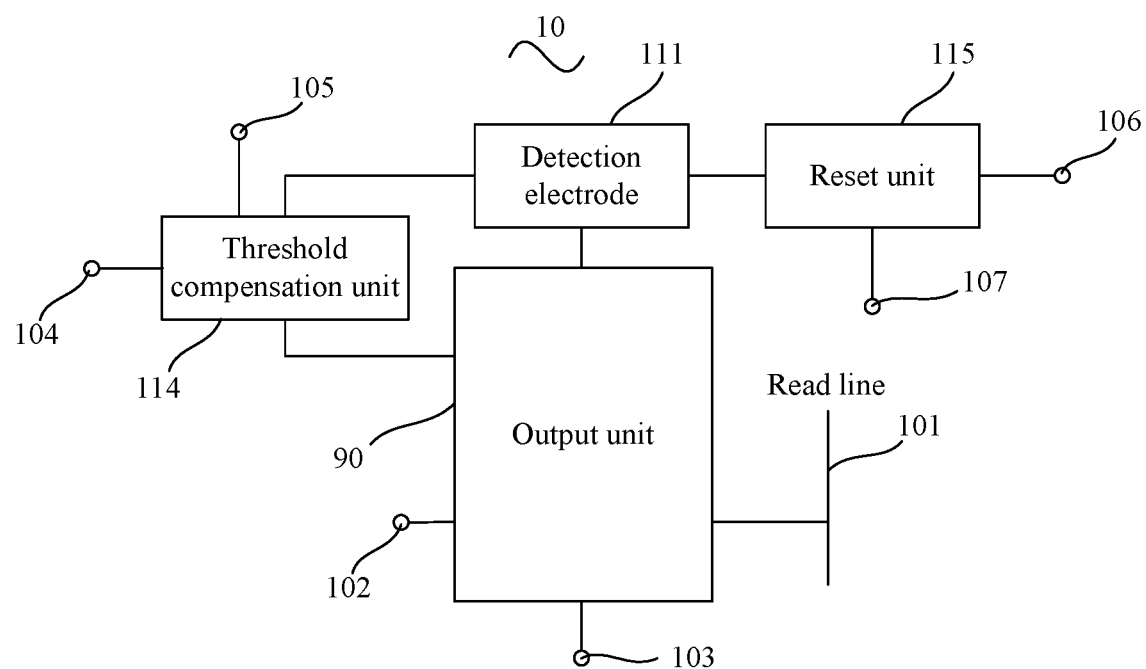
FIG. 1 is a schematic diagram showing functional modules of a fingerprint recognition unit circuit according to an embodiment.

Reference is made to FIG. 1, which is a schematic diagram showing functional modules of a fingerprint recognition unit circuit according to an embodiment. A fingerprint recognition unit circuit 10 includes a read line 101, a signal scan terminal 102, a first power supply terminal 103, a second power supply terminal 104, a third power supply terminal 106, a first signal terminal 105, a second signal terminal 107, a detection electrode 111, an output unit 90, a threshold compensation unit 114, and a reset unit 115.

The detection electrode 111 is configured to contact a surface of a finger to generate an induction capacitance. The output unit 113 is connected to the detection electrode 111, the signal scan terminal 102, the first power supply terminal 103 and the read line 101, and is configured to detect the induction capacitance, generate a current signal, and transmit the current signal to the read line 101.

The threshold compensation unit 114 is connected to the second power supply terminal 104, the first signal terminal 105, the detection electrode 111 and the output unit 90, and is configured to compensate for a threshold voltage of the output unit 90. The reset unit 115 is connected to the third power supply terminal 106, the second signal terminal 107 and the detection electrode 111, and is configured to reset the detection electrode 111.

With the above fingerprint recognition unit circuit, an induction capacitance is generated when a surface of a finger contacts the detection electrode 111. The output unit 90 detects the induction capacitance, generates a current signal, and transmits the current signal to the read line 101. The read line 101 is connected to an external processing unit to process the current signal. The threshold compensation unit 114 is configured to compensate for a threshold voltage of the output unit 90. The reset unit 115 resets the detection electrode 111, so that the detection electrode 111 is in an initial recognition state when the detection electrode 111 contacts a surface of a finger next time, thereby avoiding mutual interference between two successive fingerprint recognitions. In this way, the technical problem of non-uniform threshold voltages of TFTs due to limitation factors in the LTPS process, and the technical problem of great difference between VTHs of TFTs at different positions are solved, and threshold compensation is achieved, thereby improving the accuracy and recognition efficiency of fingerprint recognition, and thus effectively reducing a cost.

Figures 1, 2:
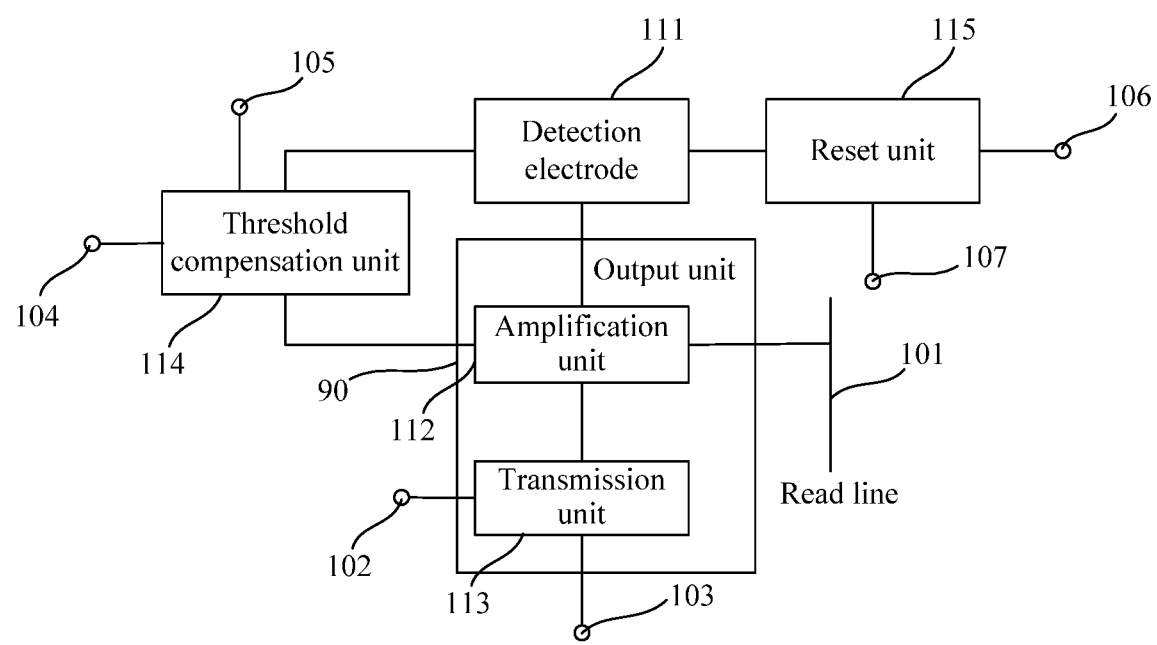
Figure 2:
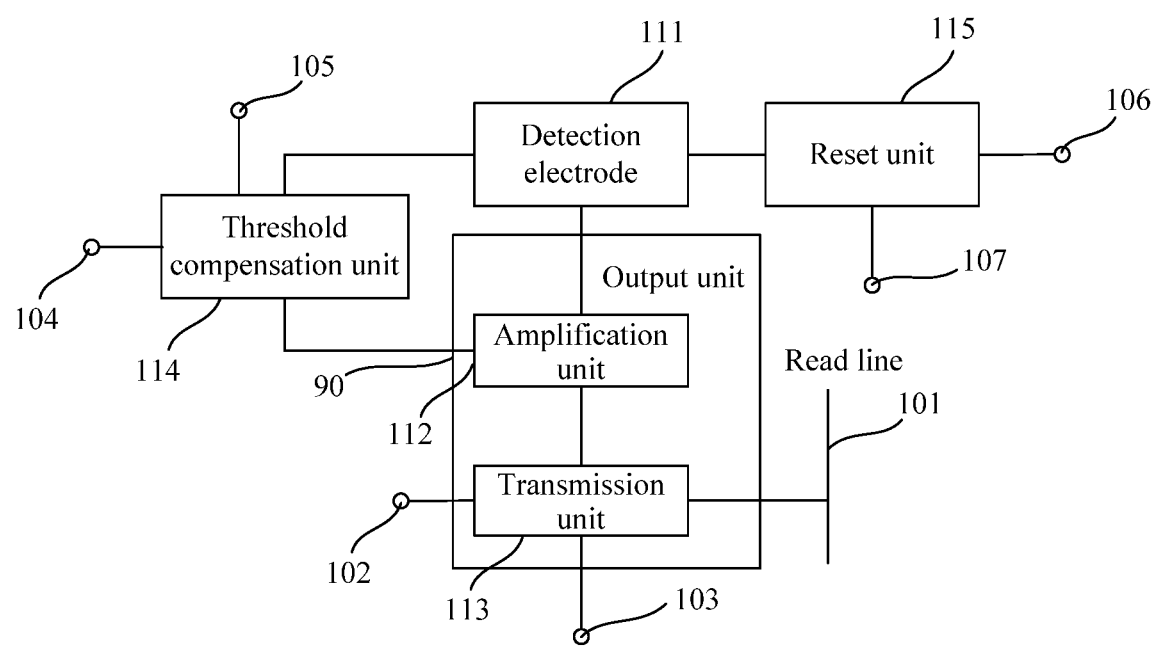

Reference is made to FIG. 2-1, which is a schematic diagram showing functional modules of a fingerprint recognition unit circuit according to another embodiment. In conjunction with FIG. 1, in this embodiment, the output unit 90 includes an amplification unit 112 and a transmission unit 113. The amplification unit 112 is connected to the detection electrode 111 and the read line 101 and is configured to detect the induction capacitance and generate a current signal. The transmission unit 113 is connected to the signal scan terminal, the first power supply terminal 103 and the amplification unit 112 and is configured to transmit a first power supply voltage signal read by the first power supply terminal 103 to the amplification unit 112.

Reference is made to FIG. 2-2, which is a schematic diagram showing functional modules of a fingerprint recognition unit circuit according to another embodiment. In conjunction with FIG. 1, in this embodiment, the output unit 90 includes an amplification unit 112 and a transmission unit 113. The amplification unit 112 is connected to the detection electrode 111 and is configured to detect the induction capacitance and generate a current signal. The transmission unit 113 is connected to the signal scan terminal 102, the first power supply terminal 103, the amplification unit 112 and the read line 101, and is configured to transmit the first power supply voltage signal read by the first power supply terminal 103 to the amplification unit 112 and transmit the current signal generated by the amplification unit 112 to the read line.

It is to be understood that the detection electrode 111 is configured to contact a surface of a finger and generate an induction capacitance. The amplification unit 112 is connected to the detection electrode 111 and the read line 101 and is configured to detect the induction capacitance and generate a current signal. The transmission unit 113 is connected to the signal scan terminal 102, the first power supply terminal 103 and the amplification unit 112, and is configured to transmit the current signal generated by the amplification unit 112 to the read line 101. The threshold compensation unit 114 is connected to the second power supply terminal 104, the first signal terminal 105, the detection electrode 111 and the amplification unit 112, and is configured to compensate for a threshold voltage of the amplification unit 112.

In view of the above, an induction capacitance is generated when a surface of a finger contacts the detection electrode 111. The amplification unit 112 detects the induction capacitance and generates a current signal. The transmission unit 113 transmits the current signal to the read line 101. The read line 101 is connected to an external processing unit to process the current signal. The threshold compensation unit 114 compensates for a threshold voltage of the amplification unit 112, such that the technical problem of non-uniform threshold voltages of TFTs due to limitation factors in the LTPS process, and the technical problem of great difference between VTHs of TFTs at different positions are solved, thereby achieving threshold compensation, achieving fingerprint recognition with high accuracy, and effectively reducing a cost.

It is to be noted that the current signal generated by the amplification unit is required to be transmitted to the read line by the transmission unit, that is, the transmission unit transmits the current signal generated by the amplification unit to the read line. That is, the transmission unit is configured to transmit a signal generated by the amplification unit to the read line.

Figure 3:
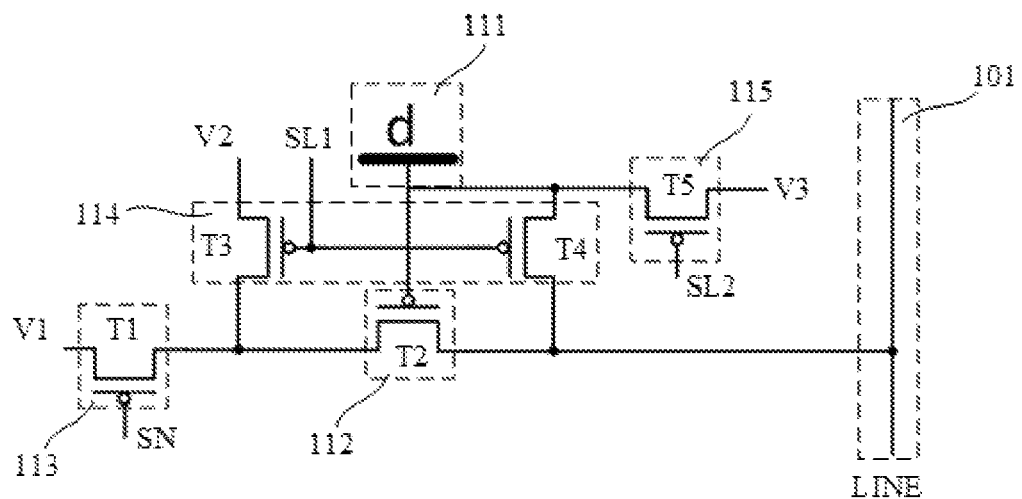
FIG. 3 is a schematic diagram showing a circuit structure of a fingerprint recognition unit circuit according to an embodiment.

Reference is made to FIG. 3, which is a schematic diagram showing a circuit structure of a fingerprint recognition unit circuit according to an embodiment. In this embodiment, the transmission unit 113 includes a first transistor T1, the amplification unit 112 includes a second transistor T2, the threshold compensation unit 114 includes a third transistor T3 and a fourth transistor T4, and the reset unit 115 includes a fifth transistor T5.

In the embodiment, description is made by taking a case where the first transistor T1, the second transistor T2, the third transistor T3, the fourth transistor T4 and the fifth transistor T5 are P-type thin film transistors (PTFT) as an example.

A gate of the first transistor T1 is connected to a signal scan terminal SN to receive a scan signal, and a source of the first transistor T1 is connected to a first power supply terminal V1 to receive the first power supply voltage VDD. It is to be noted that VDD represents an operating voltage inside a device.

A gate of the second transistor T2 is connected to a detection electrode d, a source of the second transistor T2 is connected to a drain of the first transistor T1, and a source of the second transistor T2 is connected to a read line LINE.

A gate of the third transistor T3 is connected to a first signal terminal SL1 to receive a first selection signal, a source of the third transistor T3 is connected to a second power supply terminal V2 to receive a second power supply reference voltage VREF, and a drain of the third transistor T3 is connected to the source of the second transistor T2.

A gate of the fourth transistor T4 is connected to the gate of the third transistor T3, a source of the fourth transistor T4 is connected to a drain of the second transistor T2, and a drain of the fourth transistor T4 is connected to the detection electrode d.

A gate of the fifth transistor T5 is connected to a second signal terminal SL2 to receive a second selection signal, a source of the fifth transistor T5 is connected to the detection electrode d, and a drain of the fifth transistor T5 is connected to a third power supply terminal V3 to receive a third power supply voltage VINIT.

Figure 4:
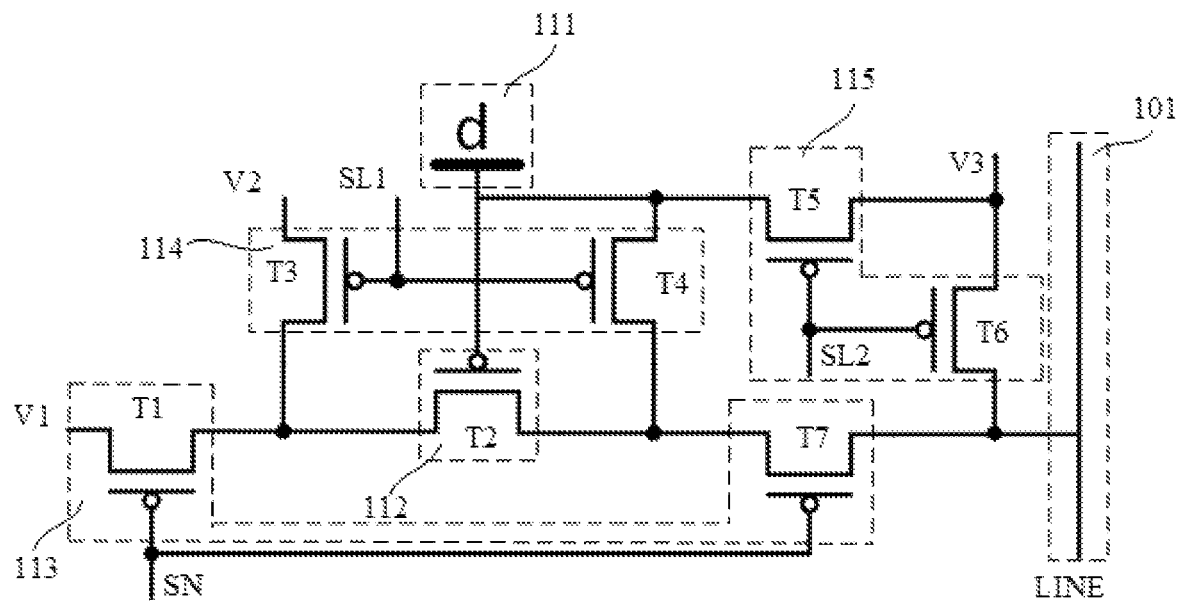
FIG. 4 is a schematic diagram showing a circuit structure of a fingerprint recognition unit circuit according to another embodiment.

Reference is made to FIG. 4, which is a schematic diagram showing a circuit structure of a fingerprint recognition unit circuit according to an embodiment. In conjunction with FIG. 3, in the fingerprint recognition unit circuit according to the embodiment, the reset unit 115 further includes a sixth transistor T6, and the transmission unit 113 further includes a seventh transistor T7. Further, description is made by taking a case where the first transistor T1, the second transistor T2, the third transistor T3, the fourth transistor T4, the fifth transistor T5, the sixth transistor T6 and the seventh transistor T7 are P-type thin film transistors as an example.

A gate of the sixth transistor T6 is connected to the second signal terminal SL2, and a drain of the sixth transistor T6 is connected to the third power supply terminal V3. A gate of the seventh transistor T7 is connected to the signal scan terminal SN, a source of the seventh transistor T7 is connected to the drain of the second transistor T2, and a drain of the seventh transistor T7 is connected to the source of the sixth transistor T6 and the read line LINE.

Figure 5:
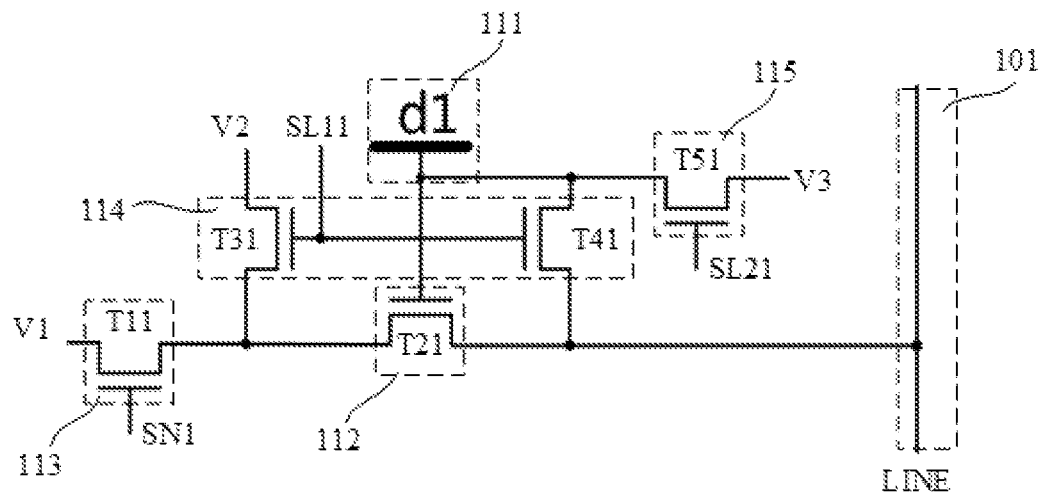
FIG. 5 is a schematic diagram showing a circuit structure of a fingerprint recognition unit circuit according to another embodiment.

Reference is made to FIG. 5, which is a schematic diagram showing a circuit structure of a fingerprint recognition unit circuit according to another embodiment. In this embodiment, description is made by taking a case where a first transistor T11, a second transistor T21, a third transistor T31, a fourth transistor T41 and a fifth transistor T51 are N-type thin film transistors (NTFT) as an example.

A gate of the first transistor T11 is connected to the signal scan terminal SN to receive a scan signal, and a source of the first transistor T11 is connected to the first power supply terminal V1 to receive a first power supply voltage VSS. It is to be noted that VSS represents a voltage at a common ground terminal of the fingerprint recognition unit circuit.

A gate of the second transistor T21 is connected to the detection electrode d1, a source of the second transistor T21 is connected to a drain of the first transistor T11, and a source of the second transistor T21 is connected to the read line LINE1.

A gate of the third transistor T31 is connected to the first signal terminal SL11 to receive the first selection signal, a source of the third transistor T31 is connected to the second power supply terminal V21 to receive the second power supply reference voltage VREF, and a drain of the third transistor T31 is connected to the source of the second transistor T21.

A gate of the fourth transistor T41 is connected to the gate of the third transistor T31, a source of the fourth transistor T41 is connected to the drain of the second transistor T21, and a drain of the fourth transistor T41 is connected to the detection electrode d1.

A gate of the fifth transistor T51 is connected to the second signal terminal SL21 to receive the second selection signal, a source of the fifth transistor T51 is connected to the detection electrode d1, and a drain of the fifth transistor T51 is connected to the third power supply terminal V3 to receive the third power supply voltage VINIT.

Figure 6:
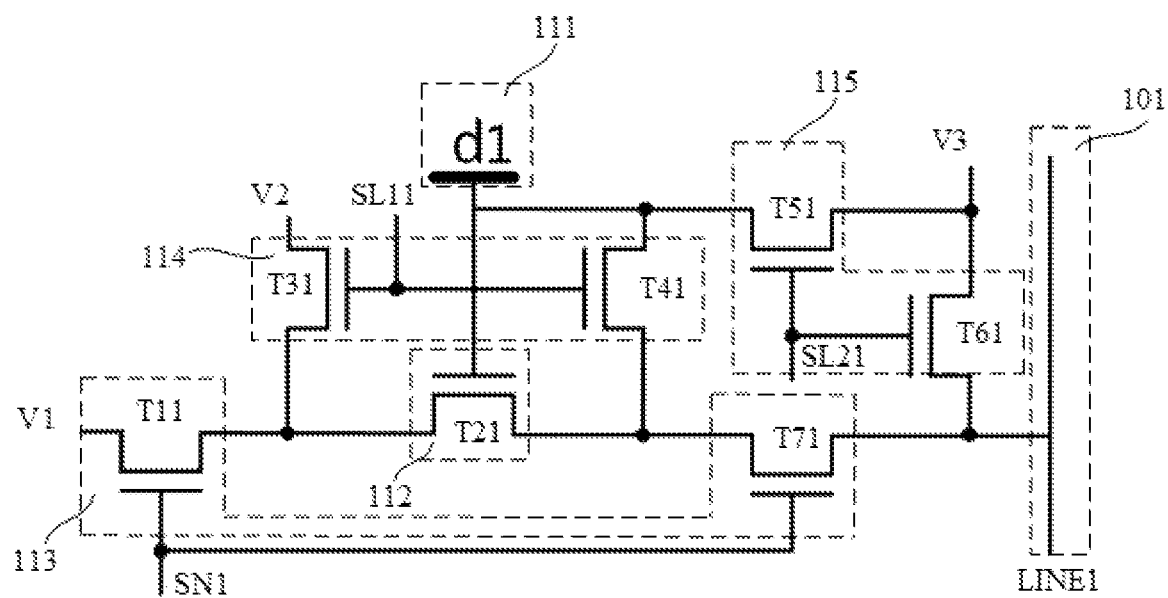
FIG. 6 is a schematic diagram showing a circuit structure of a fingerprint recognition unit circuit according to another embodiment.

Reference is made to FIG. 6, which is a schematic diagram showing a circuit structure of a fingerprint recognition unit circuit according to another embodiment. In the fingerprint recognition unit circuit according to the embodiment, the reset unit 115 further includes a sixth transistor T61, and the transmission unit 113 further includes a seventh transistor T71. Further, description is made by taking a case where the first transistor T11, the second transistor T21, the third transistor T31, the fourth transistor T41, the fifth transistor T51, the sixth transistor T61 and the seventh transistor T71 are N-type thin film transistors as an example.

A gate of the sixth transistor T61 is connected to the second signal terminal SL21, and a drain of the sixth transistor T61 is connected to the third power supply terminal V3. A gate of the seventh transistor T71 is connected to the signal scan terminal SN1, a source of the seventh transistor T71 is connected to the drain of the second transistor T21, and a drain of the seventh transistor T71 is connected to a source of the sixth transistor T61 and the read line LINE1.

Figure 7:
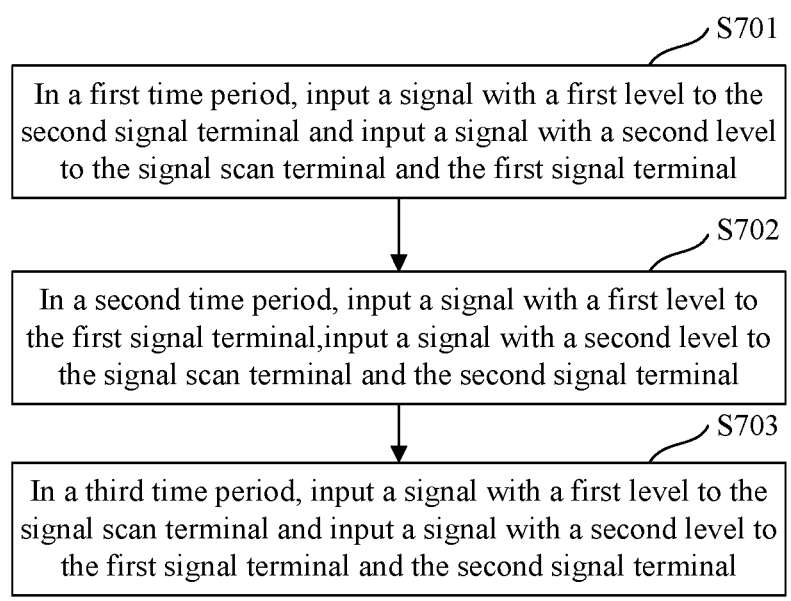
FIG. 7 is a schematic diagram showing steps of a method for controlling a fingerprint recognition unit circuit according to an embodiment.

Reference is made to FIG. 7, which is a schematic diagram showing a method for controlling a fingerprint recognition unit circuit according to an embodiment. The method for controlling a fingerprint recognition unit circuit is applied to the fingerprint recognition unit circuit described above. The method for controlling a fingerprint recognition unit circuit includes the following steps S701 to S703 respectively performed in a first time period, a second time period and a third time period which are continuous.

In step S701, in the first time period, a first level is applied to the second signal terminal, and a second level is applied to the signal scan terminal and the first signal terminal.

Specifically, in the first time period, the second selection signal with the first level is inputted to the second signal terminal, the scan signal with the second level is inputted to the signal scan terminal, and the first selection signal with the second level is inputted to the first signal terminal, such that the fifth transistor is turned on, the remaining transistors are turned off, and the third power supply resets the detection electrode. Therefore, the first time period is also called a reset phase.

Figure 8:
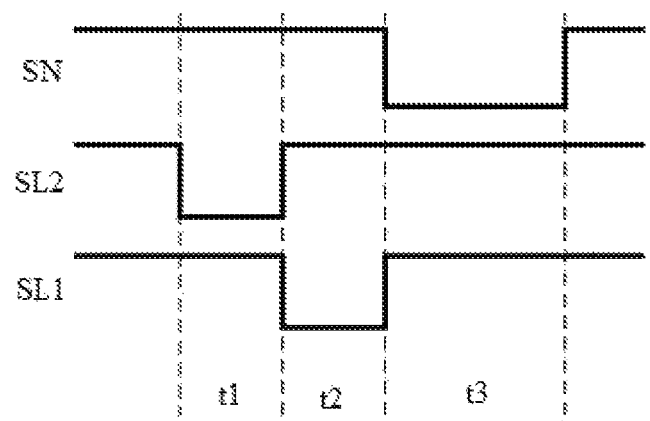
FIG. 8 is a schematic diagram showing timing sequences for the fingerprint recognition unit circuits according to the embodiments shown in FIG. 3 and FIG. 4.

Referring to FIGS. 3 and 8, in an embodiment, the first level is a low level and the second level is a high level. That is, in the first time period, a second selection signal with a low level is inputted to the second signal terminal SL2, and a scan signal with a high level is inputted to the signal scan terminal SN and a first selection signal with a high level is inputted to the first signal terminal SL1. That is, during the reset phase t1, the second selection signal is at a low level, the scan signal and the first selection signal are at a high level, the fifth transistor T5 is turned on, the remaining transistors are turned off, and the detection electrode d is reset in response to the third power supply voltage VINIT.

Referring to FIGS. 4 and 8, in an embodiment, the first level is a low level, and the second level is a high level. That is, in the first time period, a second selection signal with a low level is inputted to the second signal terminal SL2, a scan signal with a high level is inputted to the signal scan terminal SN, and a first selection signal with a high level is inputted to the first signal terminal SL1. That is, during the reset phase t1, the second selection signal is at a low level, the scan signal and the first selection signal are at a high level, the fifth transistor T5 and the sixth transistor T6 are turned on, and the remaining transistors are turned off, and the detection electrode d and the read line are reset in response to the third power supply voltage VINIT.

Figure 9:
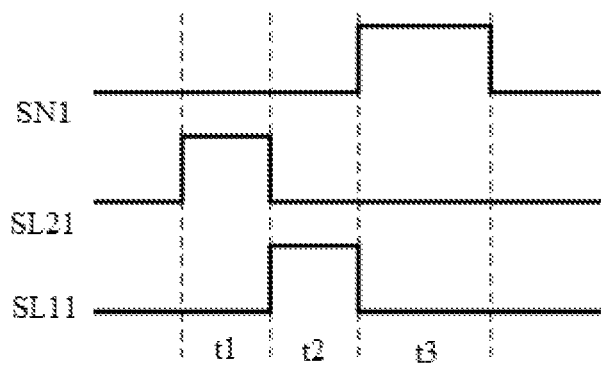
FIG. 9 is a schematic diagram showing timing sequences for the fingerprint recognition unit circuits according to the embodiments shown in FIG. 5 and FIG. 6.

Referring to FIGS. 5 and 9, in an embodiment, the first level is a high level and the second level is a low level. That is, in the first time period, a second selection signal with a high level is inputted to the second signal terminal SL21, a scan signal with a low level is inputted to the signal scan terminal SN1, and a first selection signal with a low level is inputted to the first signal terminal SL11. That is, during the reset phase t11, the second selection signal is at a high level, the scan signal and the first selection signal are at a low level, the fifth transistor T51 is turned on, the remaining transistors are turned off, and the detection electrode d is reset in response to the third power supply voltage VINIT.

Referring to FIGS. 6 and 9, in an embodiment, the first level is a high level and the second level is a low level. That is, in the first time period, a second selection signal with a high level is inputted to the second signal terminal SL21, a scan signal with a low level is inputted to the signal scan terminal SN1, and a first selection signal with a low level is inputted to the first signal terminal SL11. That is, during the reset phase t11, the second selection signal is at a high level, the scan signal and the first selection signal are at a low level, the fifth transistor T5 and the sixth transistor T6 are turned on, the remaining transistors are turned off, and the detection electrode d and the read line are reset in response to the third power supply voltage VINIT.

In step S702, in the second time period, a first level is applied to the first signal terminal, and a second level is applied to the signal scan terminal and the second signal terminal.

Specifically, in the second time period, a first selection signal with the first level is inputted to the first signal terminal, a scan signal with the second level is inputted to the signal scan terminal, and a second selection signal with a second level is inputted to the second signal terminal, such that the third transistor T3 and the fourth transistor T4 are turned on, the second transistor T2 functions as a diode in this case, and the threshold voltage of the second transistor T2 is compensated. In this way, the second transistor T2 is also turned on, the remaining transistors are turned off, and the detection electrode d is charged by the second power supply reference voltage VREF, and a potential of the detection electrode d is represented as VREF−VTH. Therefore, the second time period is also called a threshold compensation phase.

Referring to FIGS. 3 and 8, in an embodiment, the first level is a low level and the second level is a high level. That is, in the second time period, a first selection signal with a low level is inputted to the first signal terminal SL1, a scanning signal with a high level is inputted to the signal scan terminal, and a second selection signal with a high level is inputted to the second signal terminal. That is, during the threshold compensation phase t2, the first selection signal is at a low level, the scan signal and the second selection signal are at a high level, the third transistor T3 and the fourth transistor T4 are turned on, the second transistor T2 functions as a diode in this case, and the threshold voltage of the second transistor T2 is compensated. In this way, the second transistor T2 is also turned on, the remaining transistors are turned off, and the detection electrode d is charged by the second power supply reference voltage VREF, and a potential of the detection electrode d is represented as VREF−VTH.

Referring to FIGS. 4 and 8, in an embodiment, the first level is a low level and the second level is a high level. That is, in the second time period, a first selection signal with a low level is inputted to the first signal terminal SL1, a scan signal with a high level is inputted to the signal scan terminal, and a second selection signal with a high level is inputted to the second signal terminal. That is, during the threshold compensation phase t2, the first selection signal is at a low level, the scan signal and the second selection signal are at a high level, the third transistor T3 and the fourth transistor T4 are turned on, the second transistor T2 functions as a diode, and the threshold voltage of the second transistor T2 is compensated. In this way, the second transistor T2 is also turned on, the remaining transistors are turned off, and the detection electrode d is charged by the second power supply reference voltage VREF, and a potential of the detection electrode d is represented as VREF−VTH.

Referring to FIGS. 5 and 9, in an embodiment, the first level is a high level and the second level is a low level. That is, in the second time period, a first selection signal with a high level is inputted to the first signal terminal SL11, a scan signal with a low level is inputted to the signal scan terminal SN1, and a second selection signal with a low level is inputted to the second signal terminal SL21. That is, during the threshold compensation phase t2, the first selection signal is at a high level, the scan signal and the second selection signal are at a low level, the third transistor T3 and the fourth transistor T4 are turned on, the second transistor T2 functions as a diode in this case, and the threshold voltage of the second transistor T2 is compensated. In this way, the second transistor T2 is also turned on, the remaining transistors are turned off, and the detection electrode d is charged by the second power supply reference voltage VREF, and a potential of the detection electrode d is represented as VREF+VTH.

Referring to FIGS. 6 and 9, in an embodiment, the first level is a high level and the second level is a low level. That is, in the second time period, a first selection signal with a high level is inputted to the first signal terminal SL11, a scan signal with a low level is inputted to the signal scan terminal SN1, and a second selection signal with a low level is inputted to the second signal terminal SL21. That is, during the threshold compensation phase t2, the first selection signal SL1 is at a high level, the scan signal SN and the second selection signal SL2 are at a low level, the third transistor T3 and the fourth transistor T4 are turned on, the second transistor T2 functions as a diode in this case, and the threshold voltage of the second transistor T2 is compensated. In this way, the second transistor T2 is also turned on, the remaining transistors are turned off, and the detection electrode d is charged by the second power supply reference voltage VREF, and a potential of the detection electrode d is represented as VREF+VTH.

In the embodiment, after the third transistor T3 and the fourth transistor T4 are turned on, the gate and the drain of the second transistor T2 are connected with each other, and the second transistor T2 functions as a diode in this case. A current may flow to the gate and the drain through the source. In a case where a difference between voltages of the source and the gate of the second transistor T2 is equal to VTH (VTH represents the threshold voltage of the second transistor T2, which refers to an absolute value of the threshold voltage in this description), the second transistor T2 is turned off, and the detection electrode d is charged by the reference voltage VREF. In a case where the potential of the detection electrode d is equal to VREF−VTH, the second transistor T2 is turned off, and charging is finished. The threshold voltage of the second transistor T2 is compensated due to the second transistor T2 functioning as a diode. The principle of correcting the reference voltage VREF is that, an actual voltage of the detection electrode d is represented as VREF−VTH, and the VTH in the actual voltage of the detection electrode d counteracts VTH in an equation relating to a current of the amplification unit when the amplification unit operates, thereby avoiding an influence of VTH on the current, and thus achieving threshold compensation.

In this embodiment, since the second transistor T2 functions as a diode, the second transistor T2 is turned off when the difference between voltages of the source and the gate of the second transistor T2 is equal to VTH. Therefore, in a case where the third transistor T3 and the fourth transistor T4 are turned on, the second power supply reference voltage VREFVREF is applied to the source of the second transistor T2, and current flows to the gate of the second transistor T2, such that the detection electrode d is charged. In a case where the voltage at the gate of the second transistor T2 is equal to VREF−VTH, the second transistor T2 is turned off, and the voltage of the detection electrode is equal to VREF−VTH.

In step S703, in the third time period, a first level is applied to the signal scan terminal, and a second level is applied to the first signal terminal and the second signal terminal.

Specifically, in the third time period, a scan signal with the first level is inputted to the signal scan terminal, a first selection signal with the second level is inputted to the first signal terminal, and a second selection signal with the second level is inputted to the second signal terminal.

Further, in the third time period, the scan signal with the first level is inputted to the signal scan terminal, the first selection signal with the second level is inputted to the first signal terminal, and the second selection signal with the second level is inputted to the second signal terminal, such that the first transistor T1 is turned on, the third transistor T3, the fourth transistor T4 and the fifth transistor T5 are turned off, and the state of the second transistor T2 is determined by an induction capacitance generated between the detection electrode d and a surface of a finger.

Referring to FIGS. 3 and 8, in an embodiment, the first level is a low level and the second level is a high level. That is, in the third time period, a scan signal with a low level is inputted to the signal scan terminal SN, a first selection signal with a high level is inputted to the first signal terminal SL1, and a second selection signal with a high level is inputted to the second signal terminal SL2. That is, during the reading phase t3, the scan signal is at a low level, the first selection signal and the second selection signal are at a high level, the first transistor T1 is turned on, the third transistor T3, the fourth transistor T4 and the fifth transistor T5 are turned off, and the state of the second transistor T2 is determined by an induction capacitance generated between the detection electrode d and a surface of a finger.

In a process during which the scan signal jumps from a low level to a high level and a voltage at the source of the second transistor T2 jumps from the voltage VREF to the voltage VDD, a coupling effect occurs between parasitic capacitances of the second transistor T2 and the fourth transistor T4 and the induction capacitance with the finger, the voltage of the detection electrode d changes by ΔV due to a change of the voltage of the scan signal and a change of the voltage at the source of the second transistor T2. The magnitude of ΔV is determined based on a proportion of the induction capacitance to the parasitic capacitance of the transistor, and different induction capacitances may respectively result in different magnitudes of ΔV. In this way, the concave portion and the convex portion of the fingerprint are represented by different voltages of the detection electrode d. The voltage of the detection electrode d is equal to VREF−VTH+ΔV. The current of the second transistor T2 is determined based on the voltage of the detection electrode d, and different voltages of the detection electrode d respectively correspond to different currents of the second transistor T2, such that the concave portion and the convex portion of the fingerprint are represented by different current signals, and the current is expressed by the following current equation:

$$I = \frac{1}{2}\mu C_{OX}\frac{W}{L}(VDD-(VREF-VTH+\Delta V)-VTH)^2 =$$
$$\frac{1}{2}\mu C_{OX}\frac{W}{L}(VDD-VREF-\Delta V)^2$$
$$\Delta V = (VGH-VGL)\frac{C_{GD,T4}}{C_{GD,T4}+C_d} + (VDD-VREF)\frac{C_{GS,T2}}{C_{GS,T2}+C_d}$$

in which, μ represents a carrier mobility, COX represents a gate insulating layer capacitance, W represents a width of a transistor, L represents a length of the transistor, VTH represents an absolute value of the threshold voltage of the second transistor T2, $C_{GD,T4}$ represents a gate-drain capacitance of the second transistor T4, $C_{GS,T2}$ represents a gate-source capacitance of the second transistor T2, $C_{st}$ represents an induction capacitance generated between the detection electrode and a finger, and VGH and VGL respectively represent a high level and a low level of the scan signal.

According to the above equation, the voltage VREF−VTH of the detection electrode counteracts the VTH in the above current equation, and the final current equation includes no item of the threshold voltage VTH, thereby avoiding the influence of the VTH on the current, and thus achieving threshold compensation to the amplification unit.

The current signal of the second transistor T2 is transmitted to the read line through the first transistor T1, and the read line is connected to a signal processing unit, which may process a current signal or a voltage signal.

Referring to FIGS. 5 and 9, in an embodiment, the first level is a high level and the second level is a low level. That is, in the third time period, a scan signal with a high level is inputted to the signal scan terminal SN, a first selection signal with a low level is inputted to the first signal terminal SL1, and a second selection signal with a low level is inputted to the second signal terminal SL2. That is, during the reading phase t3, the scan signal is at a high level, the first selection signal and the second selection signal are at a low level, the first transistor T1 is turned on, the third transistor T3, the fourth transistor T4 and the fifth transistor T5 are turned off, and the state of the second transistor T2 is determined based on the induction capacitance generated between the detection electrode d and the surface of the finger.

In a process during which the scan signal jumps from a high level to a low level and a voltage at the source of the second transistor T2 jumps from the voltage VREF to the voltage VSS, a coupling effect occurs between parasitic capacitances of the second transistor T2 and the fourth transistor T4 and the induction capacitance with the finger, the voltage of the detection electrode d changes by ΔV due to a change of the voltage of scan signal and a change of the voltage at the source of the second transistor T2. The magnitude of ΔV is determined based on a proportion of the induction capacitance to the parasitic capacitance of the transistor, and different induction capacitances may respectively result in different magnitudes of ΔV. In this way, the concave portion and the convex portion of the fingerprint are represented by different voltages of the detection electrode d. The voltage of the detection electrode d is equal to VREF+VTH+ΔV. The current of the second transistor T2 is determined based on the voltage of the detection electrode d, and different voltages of the detection electrode d respectively correspond to different currents of the second transistor T2, such that the concave portion and the convex portion of the fingerprint are represented by different current signals, and the current is expressed by the following current equation:

$$I = \frac{1}{2}C_{OX}\frac{W}{L}(VREF + VTH + \Delta V - VSS - VTH)^2 =$$
$$\frac{1}{2}C_{OX}\frac{W}{L}(VREF - VSS + \Delta V)^2$$
$$\Delta V = (VGL - VGH)\frac{C_{GD,T4}}{C_{GD,T4} + C_d} + (VSS - VREF)\frac{C_{GS,T2}}{C_{GS,T2} + C_d}$$

in which, μ, represents a carrier mobility, COX represents a gate-insulating layer capacitance, W represents a width of a transistor, L represents a length of the transistor, VTH represents an absolute value of the threshold voltage of the second transistor T2, $C_{GD,T4}$ represents a gate-drain capacitance of the second transistor T4, $C_{GS,T2}$ represents a gate-source capacitance of the second transistor T2, $C_{st}$ represents an induction capacitance generated between the detection electrode and a finger, and VGH and VGL respectively represent a high level and a low level of the scan signal.

According to the above equation, the voltage VREF+VTH of the detection electrode counteracts the VTH in the above current equation, and the final current equation includes no item of the threshold voltage VTH, thereby avoiding the influence of the VTH on the current, and thus achieving threshold compensation to the amplification unit.

The current signal of the second transistor T2 is transmitted to the read line through the first transistor T1, and the read line is connected to a signal processing unit, which may process a current signal or a voltage signal.

Further, in the third time period, the scan signal with the first level is inputted to the signal scan terminal, the first selection signal with the second level is inputted to the first signal terminal, and the second selection signal with the second level is inputted to the second signal terminal, such that the first transistor T1 and the seventh transistor T7 are turned on, the third transistor T3, the fourth transistor T4, the fifth transistor T5 and the sixth transistor T6 are turned off, and the state of the second transistor T2 is determined based the induction capacitance generated between the detection electrode d and the surface of the finger. Therefore, the third time period may also be regarded as the reading phase.

Referring to FIGS. 4 and 8, in an embodiment, the first level is a low level and the second level is a high level. That is, in the third time period, a scan signal with a low level is inputted to the signal scan terminal SN, a first selection signal with a high level is inputted to the first signal terminal SL1, and a second selection signal with a high level is inputted to the second signal terminal SL2. That is, during the reading phase t3, the scan signal is at a low level, the first selection signal and the second selection signal are at a high level, the first transistor T1 and the seventh transistor T7 are turned on, and the third transistor T3, the fourth transistor T4, the fifth transistor T5 and the sixth transistor T6 are turned off, and the state of the second transistor T2 is determined based on the induction capacitance generated between the detection electrode d and the surface of the finger. In a process during which the scan signal jumps from a low level to a high level and a voltage at the source of the second transistor T2 jumps from the voltage VREF to the voltage VDD, a coupling effect occurs between parasitic capacitances of the second transistor T2 and the fourth transistor T4 and the induction capacitance with the finger, the voltage of the detection electrode d changes by ΔV due to a change of the voltage of scan signal and a change of the voltage at the source of the second transistor T2. The magnitude of ΔV is determined based on a proportion of the induction capacitance to a parasitic capacitance of a transistor, and different induction capacitances may respectively result in different magnitudes of ΔV. In this way, the concave portion and the convex portion of the fingerprint are represented by different voltages of the detection electrode d. The voltage of the detection electrode d is equal to VREF−VTH+ΔV. The current of the second transistor T2 is determined based on the voltage of the detection electrode d, and different voltages of the detection electrode d respectively correspond to different currents of the second transistor T2, such that the concave portion and the convex portion of the fingerprint are represented by different current signals, and the current is expressed by the following current equation:

$$I = \frac{1}{2}\mu C_{OX}\frac{W}{L}(VDD - (VREF - VTH + \Delta V) - VTH)^2 =$$
$$\frac{1}{2}\mu C_{OX}\frac{W}{L}(VDD - VREF - \Delta V)^2$$
$$\Delta V = (VGH - VGL)\frac{C_{GD,T4}}{C_{GD,T4} + C_d} + (VDD - VREF)\frac{C_{GS,T2}}{C_{GS,T2} + C_d}$$

in which, μ represents a carrier mobility, COX represents a gate insulating layer capacitance, W represents a width of a transistor, L represents a length of the transistor, VTH represents an absolute value of the threshold voltage of the second transistor T2, $C_{GD,T4}$ represents a gate-drain capacitance of the second transistor T4, $C_{GS,T2}$ represents a gate-source capacitance of the second transistor T2, $C_{st}$ represents an induction capacitance generated between the detection electrode and a finger, and VGH and VGL respectively represent a high level and a low level of the scan signal.

According to the above equation, the voltage VREF−VTH of the detection electrode counteracts the VTH in the above current equation, and the final current equation includes no item of the threshold voltage VTH, thereby avoiding the influence of the VTH on the current, and thus achieving threshold compensation to the amplification unit.

The current signal of the second transistor T2 is transmitted to the read line through the first transistor T1 and the seventh transistor T7, and the read line is connected to a signal processing unit, which may process a current signal or a voltage signal.

It is to be understood that an improvement of the embodiment shown in FIG. 4 compared with the embodiment shown in FIG. 3 mainly lies in the sixth transistor T6 and the seventh transistor T7. The sixth transistor T6 resets the read line, and the seventh transistor T7 isolates the compensation unit, the amplification unit from the read line. With the two transistors, the fingerprint recognition unit circuit is protected from being interfered by the read line when performing compensation and recognition, such that the reliability and accuracy of the fingerprint recognition unit circuit is improved.

Figure 10:
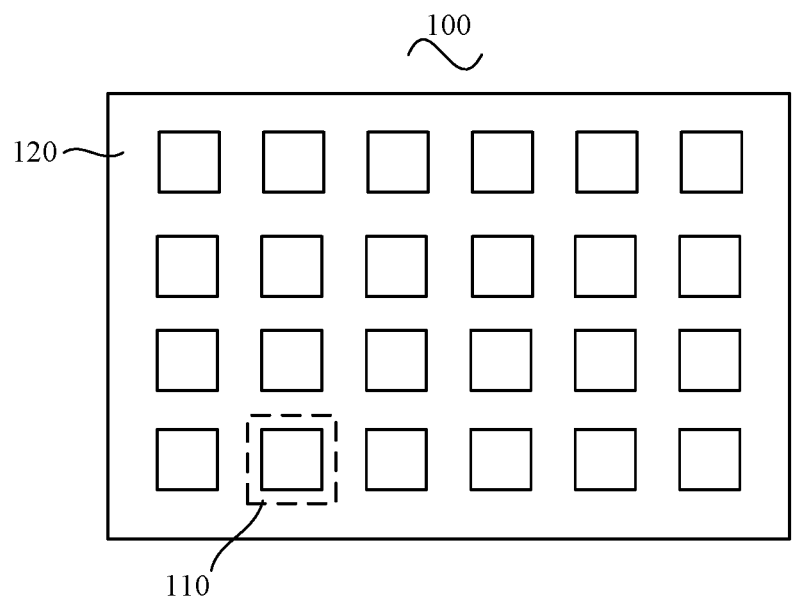
FIG. 10 is a schematic diagram showing functional modules of a fingerprint recognition device according to an embodiment.

Referring to FIGS. 6 and 10, in an embodiment, the first level is a high level and the second level is a low level. That is, in the third time period, a scan signal with a high level is inputted to the signal scan terminal SN, a first selection signal with a low level is inputted to the first signal terminal SL1, and a second selection signal with a low level is inputted to the second signal terminal SL2. That is, during the reading phase t3, the scan signal is at a high level, the first selection signal and the second selection signal are at a low level, the first transistor T1 and the seventh transistor T7 are turned on, the third transistor T3, the fourth transistor T4, the fifth transistor T5, and the sixth transistor T6 are turned off, and the state of the second transistor T2 is determined based on the induction capacitance generated between the detection electrode d and the surface of the finger.

In a process during which the scan signal jumps from a high level to a low level and a voltage at the source of the second transistor T2 jumps from the voltage VREF to the voltage VSS, a coupling effect occurs between parasitic capacitances of the second transistor T2 and the fourth transistor T4 and the induction capacitance with the finger, the voltage of the detection electrode d changes by ΔV due to a change of the voltage of scan signal and a change of the voltage at the source of the second transistor T2. The magnitude of ΔV is determined based on a proportion of the induction capacitance to the parasitic capacitance of the transistor, and different induction capacitances may respectively result in different magnitudes of ΔV. In this way, the concave portion and the convex portion of the fingerprint are represented by different voltages of the detection electrode d. The voltage of the detection electrode d is equal to VREF+VTH+ΔV. The current of the second transistor T2 is determined based on the voltage of the detection electrode d, and different voltages of the detection electrode d respectively correspond to different currents of the second transistor T2, such that the concave portion and the convex portion of the fingerprint are represented by different current signals, and the current is expressed by the following current equation:

$$I = \frac{1}{2}C_{OX}\frac{W}{L}(VREF + VTH + \Delta V - VSS - VTH)^2 = \frac{1}{2}C_{OX}\frac{W}{L}(VREF - VSS + \Delta V)^2$$

$$\Delta V = (VGL - VGH)\frac{C_{GD,T4}}{C_{GD,T4} + C_d} + (VSS - VREF)\frac{C_{GS,T2}}{C_{GS,T2} + C_d}$$

in which, μ represents a carrier mobility, COX represents a gate insulating layer capacitance, W represents a width of a transistor, L represents a length of the transistor, VTH represents an absolute value of the threshold voltage of the second transistor T2, $C_{GD,T4}$ represents a gate-drain capacitance of the second transistor T4, $C_{GS,T2}$ represents a gate-source capacitance of the second transistor T2, $C_{st}$ represents an induction capacitance generated between the detection electrode and a finger, and VGH and VGL respectively represent a high level and a low level of the scan signal.

According to the above equation, the voltage VREF+VTH of the detection electrode counteracts the VTH in the above current equation, and the final current equation includes no item of the threshold voltage VTH, thereby avoiding the influence of the VTH on the current, and thus achieving the threshold compensation to the amplification unit.

The current signal of the second transistor T2 is transmitted to the read line through the first transistor T1, and the read line is connected to a signal processing unit, which may process a current signal or a voltage signal.

It is to be understood that an improvement of the embodiment shown in FIG. 6 compared with the embodiment shown in FIG. 5 mainly lies in the sixth transistor T6 and the seventh transistor T7. The sixth transistor T6 resets the read line, and the seventh transistor T7 isolates the compensation unit, the amplification unit from the read line. With the two transistors, the fingerprint recognition unit circuit is protected from being interfered by the read line when performing compensation and recognition, such that the reliability and accuracy of the fingerprint recognition unit circuit is improved.

Reference is made to FIG. 10, which is a schematic diagram showing functional modules of a fingerprint recognition device 100 according to an embodiment. The fingerprint recognition device 100 includes multiple fingerprint recognition unit circuits and a glass substrate 120. An array of detection electrodes d1 of the multiple fingerprint recognition unit circuits is distributed on the glass substrate 120.

Figure 11:
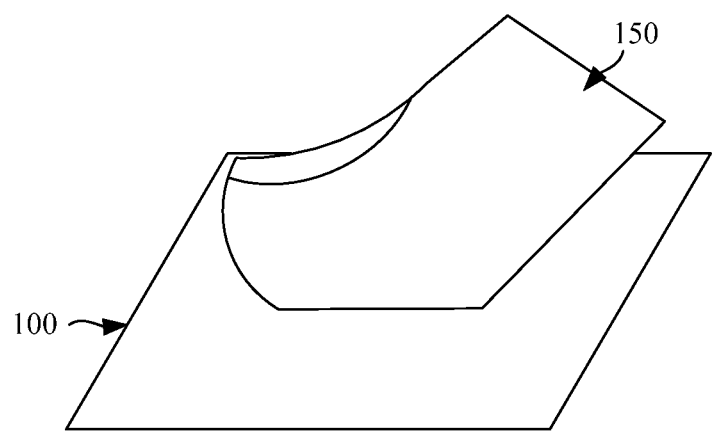
FIG. 11 is a schematic diagram showing an application scenario in which a finger is in contact with a fingerprint recognition device.
Figure 12:
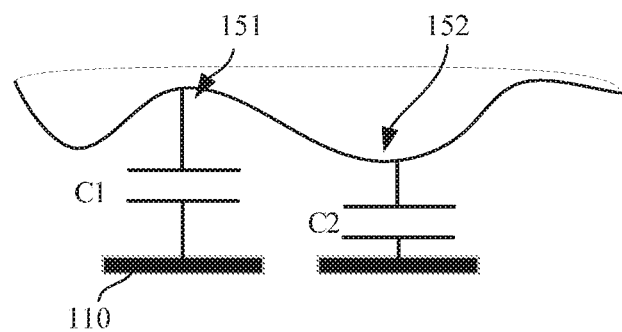
FIG. 12 is a schematic diagram showing an application scenario in which each of a concave portion and a convex portion of a fingerprint is in contact with one detection electrode.

Referring to FIG. 11 and FIG. 12, in a case where the fingerprint recognition unit operates and when a finger 150 contacts the fingerprint recognition device 100, a concave portion 151 and a convex portion 152 of the fingerprint respectively contact two adjacent detection electrodes 110. That is, when the finger contacts the fingerprint recognition device 100, a valley and a ridge of the fingerprint respectively form different induction capacitances C1 and C2 with the detection electrodes, and the amplification unit converts the induction capacitances into different currents and transmits the currents to the fingerprint recognition IC through the transmission unit for processing, such that a texture of the fingerprint is determined based on signals outputted by the fingerprint recognition unit, thereby achieving fingerprint recognition.

Figure 13:
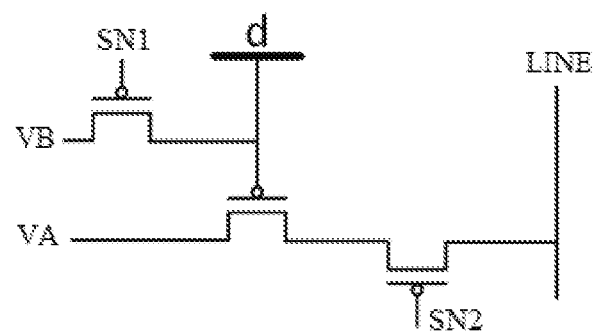
FIG. 13 is a schematic diagram showing a circuit structure of a conventional fingerprint recognition unit circuit.
Figure 14:
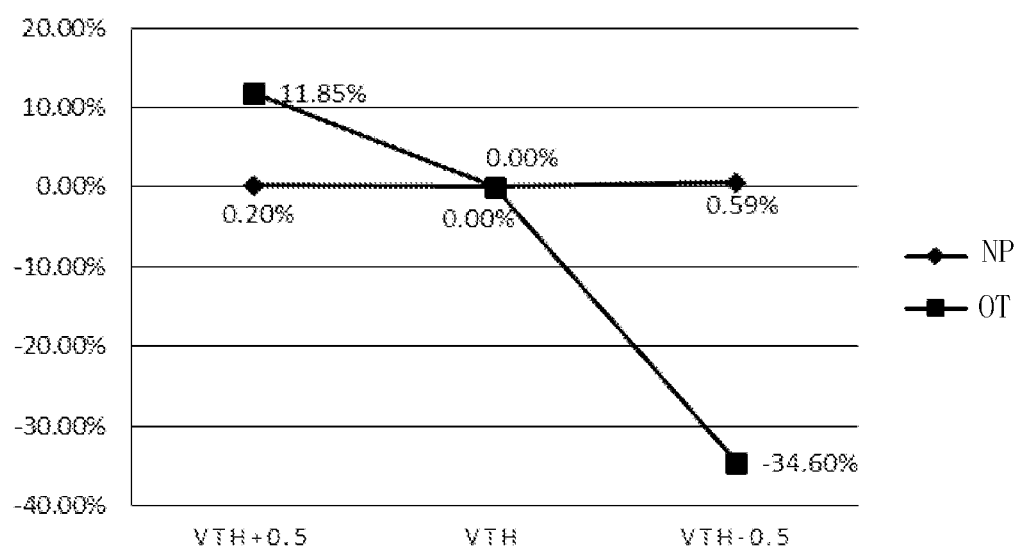
FIG. 14 is a schematic diagram showing a comparison between change rates of output signals of a fingerprint recognition unit circuit according to the present disclosure and a conventional fingerprint recognition unit circuit.

Referring to FIG. 13 and FIG. 14, from a schematic diagram showing a circuit structure of a conventional fingerprint recognition unit circuit and a schematic diagram showing a comparison between change rates of output signals of the fingerprint recognition unit circuit according to the present disclosure and the conventional fingerprint recognition unit circuit, it can be seen that when the threshold voltage VTH changes by ±0.5V from an original threshold voltage VTH functioning as a reference voltage, a change rate of an output signal may be calculated according to an equation of [(output signal−original output signal)/original output signal]. The change rate of the output signal is indicated in percentage form, such that a fluctuation of the output signal of the circuit may be shown when the threshold voltage changes.

It can be seen from the comparison that when the threshold voltage changes by +0.5V, the output OT of the conventional circuit fluctuates by +11.85%, and the output NP of the circuit of the present disclosure fluctuates by only +0.2%. When the threshold voltage changes by −0.5V, the output of the conventional circuit fluctuates by −34.6%, and the output of the circuit of the present disclosure fluctuates by only +0.59%. It can be seen that, with the circuit of the present disclosure, the threshold voltage is compensated, such that a stable and accurate operation of the fingerprint recognition circuit can be ensured.

In summary, with the fingerprint recognition unit circuit of the present disclosure, the threshold compensation to a thin film transistor in the amplification unit can be realized through the threshold compensation unit, thereby achieving fingerprint recognition with high accuracy. Specifically, in the fingerprint recognition method based on the glass substrate and the LTPS process, problems in fingerprint recognition caused by a difference among thresholds can be effectively alleviated, such that the stability and accuracy of the circuit can be improved, and the possibility of fabricating a fingerprint recognition circuit based on the glass substrate and the LTPS process can be improved, thereby reducing a cost of fingerprint recognition.

The technical features of the above embodiments may be combined in any ways. For the sake of brevity of description, not all possible combinations of the technical features in the above embodiments are described. However, as long as there is no contradiction between the combinations of these technical features, all the combinations of these technical features should fall within the scope of the description.

The above embodiments are merely illustrative of several embodiments of the present disclosure, and the description thereof is more specific and detailed. The embodiments should not be construed as limiting the scope of the present disclosure. It should be noted that a number of variations and modifications may be made by those skilled in the art without departing from the spirit and scope of the present disclosure, and these variations and modifications should fall within the protection scope of the present disclosure. Therefore, the protection scope of the present disclosure should be determined by the claims.

The invention claimed is:

1. A fingerprint recognition unit circuit, comprising:
    a read line;
    a signal scan terminal;
    a first power supply terminal;
    a second power supply terminal;
    a third power supply terminal;
    a first signal terminal;
    a second signal terminal;
    a detection electrode configured to contact a surface of a finger to generate an induction capacitance;
    an output unit connected to the detection electrode, the signal scan terminal, the first power supply terminal and the read line and configured to detect the induction capacitance, generate a current signal, and transmit the current signal to the read line;
    a threshold compensation unit connected to the second power supply terminal, the first signal terminal, the detection electrode and the output unit and configured to compensate for a threshold voltage of the output unit; and
    a reset unit connected to the third power supply terminal, the second signal terminal and the detection electrode and configured to reset the detection electrode.

2. The fingerprint recognition unit circuit according to claim 1, wherein the output unit comprises:
    an amplification unit connected to the detection electrode and the read line and configured to detect the induction capacitance and generate a current signal; and
    a transmission unit connected to the signal scan terminal, the first power supply terminal and the amplification unit and configured to transmit a first power supply voltage signal to the amplification unit.

3. The fingerprint recognition unit circuit according to claim 2, wherein the transmission unit comprises a first transistor, the amplification unit comprises a second transistor, the threshold compensation unit comprises a third transistor and a fourth transistor, and the reset unit comprises a fifth transistor, and wherein
    a gate of the first transistor is connected to the signal scan terminal to receive a scan signal, and a source of the first transistor is connected to the first power supply terminal;
    a gate of the second transistor is connected to the detection electrode, a source of the second transistor is connected to a drain of the first transistor, and a drain of the second transistor is connected to the read line;
    a gate of the third transistor is connected to the first signal terminal to receive a first selection signal, a source of the third transistor is connected to the second power supply terminal, and a drain of the third transistor is connected to the source of the second transistor;
    a gate of the fourth transistor is connected to the gate of the third transistor, a source of the fourth transistor is connected to the drain of the second transistor, and a drain of the fourth transistor is connected to the detection electrode; and
    a gate of the fifth transistor is connected to the second signal terminal to receive a second selection signal, a source of the fifth transistor is connected to the detection electrode, and a drain of the fifth transistor is connected to the third power supply terminal.

4. The fingerprint recognition unit circuit according to claim 3, wherein the reset unit comprises a sixth transistor, and the transmission unit comprises a seventh transistor, and wherein
    a gate of the sixth transistor is connected to the second signal terminal, and a drain of the sixth transistor is connected to the third power supply terminal; and
    a gate of the seventh transistor is connected to the signal scan terminal, a source of the seventh transistor is connected to the drain of the second transistor, and a drain of the seventh transistor is connected to a source of the sixth transistor and the read line.

5. The fingerprint recognition unit circuit according to claim 4, wherein the first transistor, the second transistor, the third transistor, the fourth transistor, the fifth transistor, the sixth transistor and the seventh transistor are P-type thin film transistors or N-type thin film transistors.

6. A method for controlling a fingerprint recognition unit circuit, wherein the method is applied to the fingerprint recognition unit circuit according to claim 2, and the method comprises:
    in a first time period, inputting a signal with a first level to the second signal terminal and inputting a signal with a second level to the signal scan terminal and the first signal terminal;
    in a second time period, inputting a signal with the first level to the first signal terminal and inputting a signal with the second level to the signal scan terminal and the second signal terminal; and
    in a third time period, inputting a signal with the first level to the signal scan terminal and inputting a signal with the second level to the first signal terminal and the second signal terminal, and wherein
    the first time period, the second time period and the third time period are continuous.

7. The method for controlling a fingerprint recognition unit circuit according to claim 6, wherein the first level is a low level and the second level is a high level.

8. The method for controlling a fingerprint recognition unit circuit according to claim 6, wherein the first level is a high level and the second level is a low level.

9. The fingerprint recognition unit circuit according to claim 1, wherein the output unit comprises:
   an amplification unit connected to the detection electrode and configured to detect the induction capacitance and generate a current signal; and
   a transmission unit connected to the signal scan terminal, the first power supply terminal, the amplification unit and the read line and configured to transmit a first power supply voltage signal to the amplification unit and transmit the current signal generated by the amplification unit to the read line.

10. The fingerprint recognition unit circuit according to claim 9, wherein the transmission unit comprises a first transistor, the amplification unit comprises a second transistor, the threshold compensation unit comprises a third transistor and a fourth transistor, and the reset unit comprises a fifth transistor, and wherein
   a gate of the first transistor is connected to the signal scan terminal to receive a scan signal, and a source of the first transistor is connected to the first power supply terminal;
   a gate of the second transistor is connected to the detection electrode, a source of the second transistor is connected to a drain of the first transistor, and a drain of the second transistor is connected to the read line;
   a gate of the third transistor is connected to the first signal terminal to receive a first selection signal, a source of the third transistor is connected to the second power supply terminal, and a drain of the third transistor is connected to the source of the second transistor;
   a gate of the fourth transistor is connected to the gate of the third transistor, a source of the fourth transistor is connected to the drain of the second transistor, and a drain of the fourth transistor is connected to the detection electrode; and
   a gate of the fifth transistor is connected to the second signal terminal to receive a second selection signal, a source of the fifth transistor is connected to the detection electrode, and a drain of the fifth transistor is connected to the third power supply terminal.

11. A fingerprint recognition device, comprising:
a glass substrate; and
a plurality of fingerprint recognition unit circuits, wherein an array of detection electrodes of the plurality of fingerprint recognition unit circuits are distributed on the glass substrate, and each of the plurality of fingerprint recognition unit circuits comprises:
   a read line;
   a signal scan terminal;
   a first power supply terminal;
   a second power supply terminal;
   a third power supply terminal;
   a first signal terminal;
   a second signal terminal;
   a detection electrode configured to contact a surface of a finger to generate an induction capacitance;
   an output unit connected to the detection electrode, the signal scan terminal, the first power supply terminal and the read line and configured to detect the induction capacitance, generate a current signal, and transmit the current signal to the read line;
   a threshold compensation unit connected to the second power supply terminal, the first signal terminal, the detection electrode and the output unit and configured to compensate for a threshold voltage of the output unit; and
   a reset unit connected to the third power supply terminal, the second signal terminal and the detection electrode and configured to reset the detection electrode.

* * * * *